United States Patent [19]

Shimosato et al.

[11] Patent Number: 4,768,044

[45] Date of Patent: Aug. 30, 1988

[54] PRINTING DEVICE

[75] Inventors: Masashi Shimosato; Shigeru Okuno, both of Mishima, Japan

[73] Assignee: Tokyo Electric Co., Ltd., Tokyo, Japan

[21] Appl. No.: 87,214

[22] Filed: Aug. 20, 1987

[30] Foreign Application Priority Data

Aug. 27, 1986 [JP] Japan ................................ 61-200392

[51] Int. Cl.[4] ............................................ G01D 15/16

[52] U.S. Cl. ............................................ 346/140 R

[58] Field of Search ......................... 346/140; 400/126; 101/DIG. 13, 426

[56] References Cited

U.S. PATENT DOCUMENTS

| | | | |
|---|---|---|---|
| 3,052,213 | 9/1962 | Schaffert | 101/426 X |
| 4,549,243 | 10/1985 | Owen | 361/228 |
| 4,700,204 | 10/1987 | Nakayama | 346/140 |
| 4,710,784 | 12/1987 | Nakayama | 346/140 |

FOREIGN PATENT DOCUMENTS

| | | |
|---|---|---|
| 121241 | 10/1984 | European Pat. Off. . |
| 49-40432 | 4/1974 | Japan . |
| 54-23534 | 2/1979 | Japan . |
| 56-170 | 1/1981 | Japan . |
| 56-4467 | 1/1981 | Japan . |
| 57-188382 | 11/1982 | Japan . |
| 59-159355 | 9/1984 | Japan . |

*Primary Examiner*—Joseph W. Hartary
*Attorney, Agent, or Firm*—Oblon, Fisher, Spivak, McClelland & Maier

[57] ABSTRACT

The present invention provides a printing device wherein drying of ink in a recording electrode and resulting choking of the recording electrode can be prevented and ordinary ink can be used. The printing device includes a recording electrode which has formed at the center of the section along the entire length thereof a narrow hole for sucking and supplying ink to a front end portion of the recording electrode by a capillary phenomenon. The recording electrode further has a through-hole formed therein and communicating with the narrow hole and a rear end portion of the recording electrode so that ink may be supplied at a high speed from the narrow hole to the end portion of the recording electrode by a capillary phenomenon. Drying of ink is prevented by the fact that ink comes around in the through-hole communicating with the narrow hole.

11 Claims, 4 Drawing Sheets

PRINTING DEVICE

FIELD OF THE INVENTION AND RELATED ART STATEMENT

This invention relates to a printing device which forms a large number of dots on a record medium so as to print a picture image of a character, a figure or the like by a combination of such printed dots, and particularly to a printing device of the type mentioned wherein liquid ink is electrostatically caused to fly so as to form dots on a record medium.

A large number of inventions and improvements have been made to ink jet printers wherein liquid ink drops are jetted from a nozzle in order to form a picture image on a record medium because ink jet printers are advantageous in various points. For example, an ink jet printer produces little noises, and where multi-color printing is effected, it is superior with respect to the running cost and so on comparing with other various printing systems. Still, countermeasures to choking of a nozzle arising from evaporation of ink are not sufficient and make a problem in practical use of an ink jet printer.

Different printers have been proposed which use liquid ink but employ different operating principles from such ink jet printers as described above in order to eliminate the problem of choking of a nozzle.

One of such printers is disclosed in Japanese Patent Applications Nos. 56-170 and 56-4467 wherein an opening in the form of a slit is formed in place of a nozzle which readily causes choking and recording electrodes are located in the opening while an opposing electrode is located in an opposing relationship to the recording electrodes with a record medium interposed therebetween. In a printer of the structure just described, an electric field is applied between the recording electrodes and the opposing electrode so that ink in the electric field may be separated and come out as ink drops from the opening and be flown to the record medium thereby to print on the record medium.

A printer of a different type is disclosed in Japanese Patent Applications Nos. 54-23534 and 59-159355 wherein magnetic ink is magnetically introduced to end portions of needle members along outer peripheries of the needle members and is then caused to fly by an electric field applied between the needle members and an opposing electrode which is located similarly in an opposing relationship to the needle members with a record medium interposed therebetween.

Problems of the prior art printers will now be described. The printer as disclosed in Japanese Patent Applications Nos. 56-170 and 56-4467 has a drawback that the structure for causing ink to come out as ink drops from the opening in the form of a slit is critical and lacks in stability. In other words, the amount or direction of ink to fly is not fixed, and consequently the shape and so on of a dot formed on a record medium is not fixed. Accordingly, printing of a high quality is difficult to attain. Meanwhile, the printer as disclosed in Japanese Patent Applications Nos. 54-23534and 59-159355 has a drawback that ink of a desired color cannot always be available because magnetic ink, which must be used in order to introduce ink to ends of the needle members, somewhat presents a ground color of magnetic powder contained therein.

OBJECTS AND SUMMARY OF THE INVENTION

It is a first object of the present invention to provide a printing device which can cause ink to fly in a stabilized condition toward a record medium.

It is a second object of the present invention to provide a printing device wherein any kind of ink can be used.

It is a third object of the present invention to provide a printing device wherein a dot having a profile of a true circle can be formed on a record medium.

In order to attain the objects described above, according to the present invention, there is provided a printing device which comprises a conductive recording electrode having formed at the center of the section along the entire length thereof a narrow hole for supplying ink to a front end portion of the recording electrode by a capillary phenomenon, the recording electrode further having a through-hole formed therein along the direction of the length thereof, the through-hole communicating with the narrow hole and a rear end portion of the recording electrode, and an opposing electrode located in an opposing relationship to the recording electrode with a record medium interposed therebetween. Accordingly, ink is supplied at a high speed from the narrow hole to the end portion of the recording electrode by a capillary phenomenon while ink comes around in the through-hole which communicates with the narrow hole. Accordingly, drying of ink in the narrow hole and resultant choking of the narrow hole can be prevented. In addition, the necessity of use of magnetic ink is eliminated, and consequently selection of a desired color can be enabled.

DESCRIPTION OF THE PREFERRED EMBODIMENTS

Figure 1:
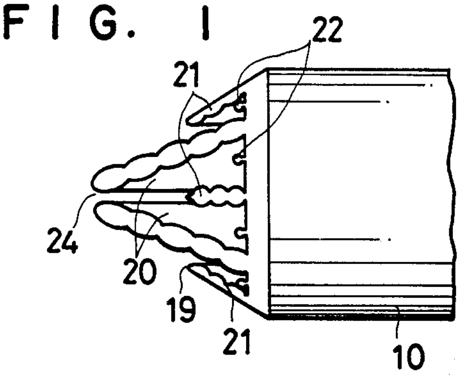
FIG. 1 is a side elevational view of an end portion of a recording electrode showing a first embodiment of the present invention.

A first embodiment of the present invention will now be described with reference to FIGS. 1 to 7. At first, the structure of an entire printing device will be described with reference to FIG. 4. The printing device includes a printer body 1 in which a carrier 3 is mounted for sliding movement on a guide shaft 2. An opposing electrode 4 extends in parallel with the guide shaft 2 in the printer body 1, and a tractor 6 for feeding record sheet 5 as a record medium is also located in the printer body 1. A print head 7 is carried on the carrier 3.

Figure 5:
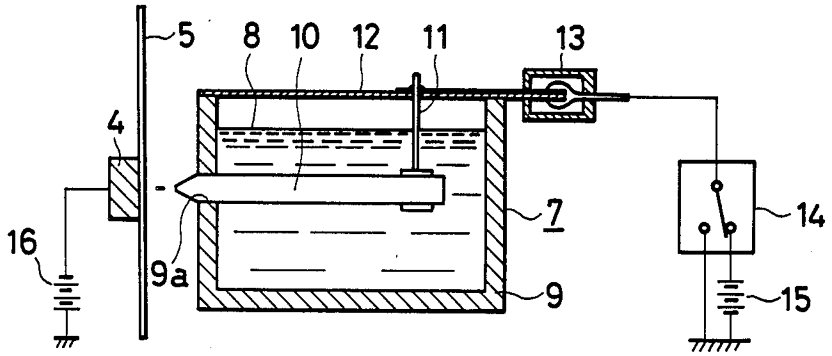
FIG. 5 is a vertical sectional side elevational view of a print head.
Figure 6:
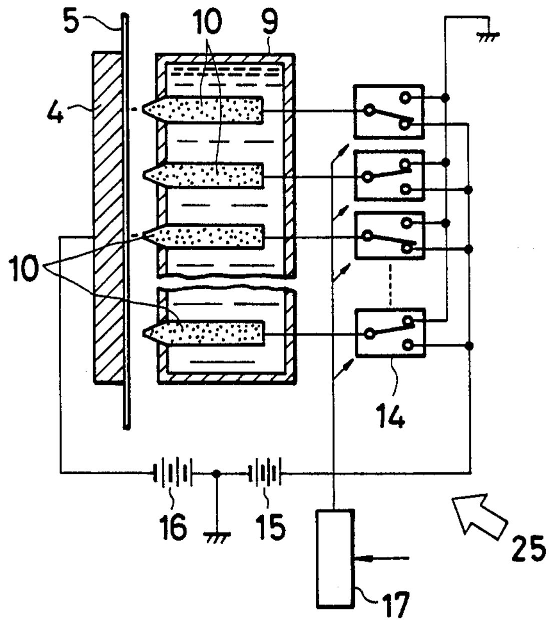
FIG. 6 is a horizontal sectional plan view of the print head of FIG. 5.

Here, the print head 7 will be described with reference to FIGS. 5 and 6. The print head 7 includes an ink vessel 9 in which ink 8 is stored, and a plurality of recording electrodes 9 located in the ink vessel 9. The ink 8 may be ordinary ink having a specific resistance higher than $10^6$ Ωcm, a coefficient of viscosity lower than 10 cp and a surface tension smaller than 20 dyn/cm, that is, ink other than magnetic ink may be used. Meanwhile, the recording electrodes 10 extend at end portions thereof outwardly through electrode holes **9*a* formed in the ink vessel 9 and are thus opposed to the opposing electrode 4 while rear end portions of the recording electrodes 10 are held by conductor lines 11 secured to a printed circuit board 12 which covers the ink vessel 9. The recording electrodes 10 are electrically connected, via the conductor lines 11 and the printed circuit board 12 and further via a connector 13 and switches 14, to power sources 15, 16 connected to the opposing electrode 4. Further, a controlling circuit 17 for selectively switching the switches 14 is connected to the switches 14 as shown in FIG. 5. Thus, the switches 14 and the controlling circuit 17 constitute a driving means 25 together with the power sources 15, 16**.

Figure 2:
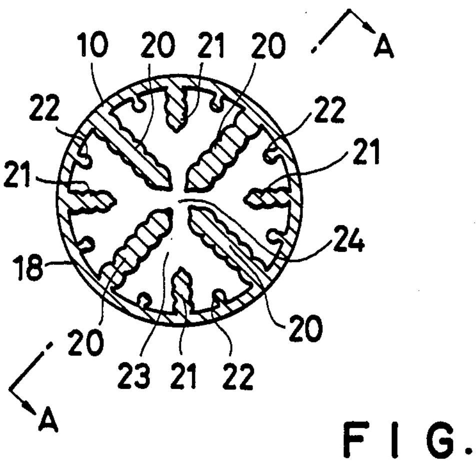
FIG. 2 is a vertical sectional front elevational view of the recording electrode of FIG. 1.
Figure 3:
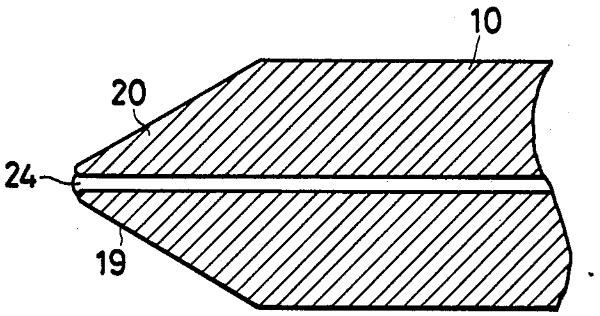
FIG. 3 is a cross sectional view taken along line A—A of FIG. 2.
Figure 4:
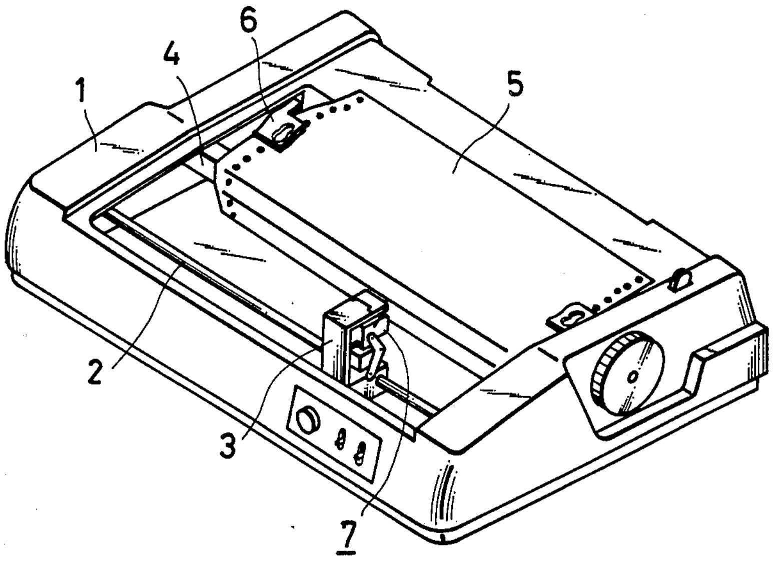
FIG. 4 is a perspective view of an entire printing device.

Now, the structure of the recording electrodes 10 will be described with reference to FIGS. 1 to 3. The recording electrodes 10 are formed by protrusion molding of a polyacetal resin as a molding material and coating on a surface of each of such molded bodies with a thin metal film 18. Each of the recording electrodes 10 has a conical portion 19 formed at an end portion thereof so that it has a taper shape at the end thereof. Meanwhile, each of the recording electrodes 10 actually has a cylindrical hollow formed therein, and four main ribs 20, four ribs 21 and eight small ribs 22 are formed along the entire length of the recording electrode 10 on an inner circumferential wall of the cylindrical hollow and extend radially toward the center of the section of the recording electrode 10 so as to serve as partition walls but such that radially inner ends of the main ribs 20, the ribs 21 and the small ribs 22 may not interfere with each other. Thus, the spacing defined by the radial inner ends of the main ribs 20 constitutes a narrow hole 24 while the spacings defined by the main ribs 20, the ribs 21 and the small ribs 22 constitute through-holes 23 which communicate with the narrow hole 24. Particularly, the main ribs 20, the ribs 21, and the small ribs 22 have identical sizes and identical shapes in individual groups. Accordingly, the narrow hole 24 is located at the center of the cross section of the recording electrode 10 and extends from the rear end of the recording electrode 10 to the apex of the conical portion 19 all through the recording electrode 10. Meanwhile, the through-holes 23 extend from the rear end of the recording electrode 10 through the recording electrode 10 and are opened to an outer peripheral face of the conical portion 19 of the recording electrode 10. Further, the main ribs 20 and the ribs 21, 22 have convexes and concaves formed on surfaces thereof, thereby forming portions of larger sectional areas and portions of smaller sectional areas at the through-holes 23 and the narrow hole 24. It is to be noted that the diameter of a minimum portion of the narrow hole 24 is determined smaller than 100 microns and especially, for example, 30 microns to 50 microns.

In addition, in polishing the outer peripheral face of the conical portion 19, burrs may appear on a polished surface. Because such burrs may make a cause of choking of the narrow hole 24 or a cause of an error in cross sectional shape of the narrow hole 24 and/or the through-holes 24, the outer peripheral face of the conical portion 19 is finished by dry honing. In this case, the alundum grain of #800 is suitable.

In such a construction as described above, if an electric field is applied between the opposing electrode 4 and a selected one of the recording electrodes 10 by the driving means 25, ink 8 which comes around the end of the recording electrode 10 receives an electrostatic force and is thus caused to fly toward the opposing electrode 4. The ink 8 thus flown clings to record paper 5 and forms a dot on the latter so that a character or a figure may be drawn by a selective group of such ink dots.

Meanwhile, the through-holes 23 suck ink 8 from within the ink vessel 9 due to a capillary phenomenon while the narrow hole 24 having a small sectional area suck ink 8 at a high speed from within the through-holes 23 of a greater sectional area by a capillary phenomenon. Since in this instance the ink 8 will sufficiently come around into the through-holes 23 to promote the communication of the ink 8 within the recording electrode 10, drying of the ink 8 within the recording electrode 10 is prevented. Besides, since the through-holes 23 and the narrow hole 24 have portions of smaller sectional areas and portions of greater sectional areas formed therein, the ink sucking operation by a capillary phenomenon can be accelerated at the portions having smaller sectional areas while the ink is maintained in the form of liquid at the portions of greater sectional areas so that choking of the recording electrode 10 can be prevented.

On the other hand, if attention is paid to an instant at which ink 8 flies, the ink 8 flies not from a slit portion but from an end portion of the recording electrode 10 in the form of a needle. Accordingly, the ink 8 is smoothly separated from the end portion of the recording electrode 10, and consequently the amount and the direction of the ink 8 to fly as ink dots are fixed. Accordingly, the printing condition will be stabilized, and consequently improvement in quality of printed results can be anticipated. Further, since the end portion of the recording electrode 10 is shaped into a tapered shape by forming the conical portion 19, an electric field tends to concentrate on the apex of the conical portion 19 due to its distance and shape, which will make separation of ink 8 further smooth and will thus further stabilize the flying direction of ink 8. Besides, since the narrow hole 24 which supplies ink 8 at a high speed extends through the apex of the conical portion 19, ink 8 can be supplied well to the apex of the conical portion 19. It is to be noted that, at an instant when ink 8 flies from the end portion of the recording electrode 10, ink 8 is supplied to the narrow hole 24 not only by a capillary phenomenon but also by coming around of the ink 8 from the through-holes 23. Accordingly, supply of ink 8 will not cause shortage, and a fixed printing condition is maintained.

Figure 7A:
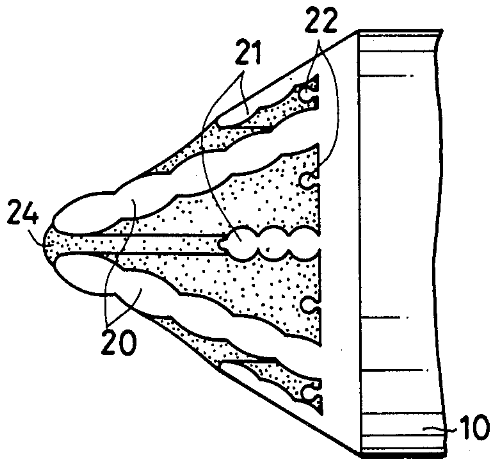
FIGS. 7(*a*) and 7(*b*) are vertical sectional side elevational views showing an end portion of a narrow hole in an enlarged scale.
Figure 7B:
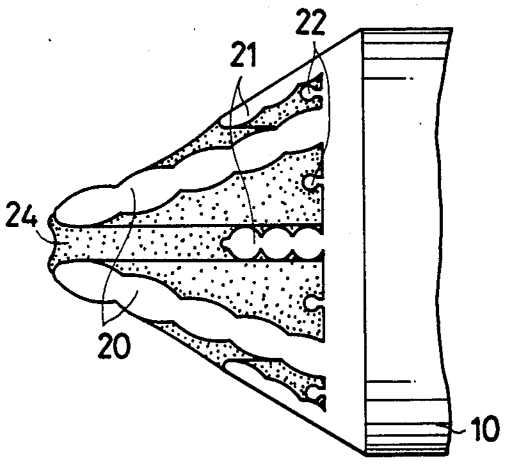

On the other hand, if the diameter of the narrow hole 24 is increased, a depression will appear in a surface of ink at the open end of the narrow hole 24 as shown in FIG. 7(*b*) so that a disorder may appear in the shape of an ink drop to fly. But if the minimum diameter of the narrow hole 24 is determined less than 100 microns, an ink drop will concentrate at the center of the narrow hole 24 as shown in FIG. 7(*b*). However, such phenomena depend on characteristics of ink 8 employed in the present embodiment. Accordingly, where ink 8 of different characteristics is used, such a holding profile of ink 8 as shown in FIG. 7(*a*) may sometimes be realized if the minimum diameter of the narrow hole 24 is greater than 100 microns.

Further, while the narrow hole 24 is opened at the center of the end of the conical portion 19, since the four main ribs 20 extend radially toward the center of the conical portion 19, the vertical and horizontal dimensions of an ink dot are determined the same so that a disorder of the shape of a dot will be prevented. Consequently, dots formed on record paper 5 are maintained in a fixed profile close to a true circle, which contributes to improvement in quality of printed results.

In addition, since supply of ink 8 to the end portion of the electrode 10 is effected by a capillary phenomenon, ordinary ink can be used in the printing device, and accordingly an ink of a vivid color can be selectively used.

It is to be added that, when the present invention is reduced to practice, the recording electrode 10 may be any of recording electrodes having structures as listed below:

(1) A structure wherein a molded body which is formed by extrusion molding using polyethylene terephthalate as a molding material is coated with a thin metal film on a surface thereof;

(2) A structure which is formed by extrusion molding using, as a molding material, a conductive plastics material in which carbon grain is mixed; and (3) A structure which is formed by extrusion molding by a special method using a material in which powder of alumina is mixed as a binder. Particularly a recording electrode of the structure (1) above is superior in regard to ink resisting property to a recording electrode made of a polyacetal resin material, and the strength of a thin metal film for coating can be increased. Meanwhile, in a recording electrode of the structure (2), where metal powder, carbon powder or the like is used as a mixture in place of alumina which is not conductive, a step of coating a thin metal film after extrusion molding can be omitted.

Further, the recording electrode 10 may not have such a specific profile as a cylindrical profile but may be any of various profiles such as, for example, an elliptical or polygonal profile, or a profile having a step or shoulder at an intermediate portion, or else a profile having different sectional shapes at front and rear end portions. In other words, the profile is not limited to a particularly fixed one.

In addition, such a modified structure may be employed that the recording electrodes 10 are moved toward and away from the opposing electrode 4 while a fixed potential is applied between the opposing electrode 4 and the recording electrodes 10. According to the structure, at an instant when the opposing electrode 4 and the recording electrodes 10 come close to each other, an electrostatic force sufficient to cause ink 8 present at the end portion of the recording electrode 10 to fly toward the opposing electrode 4 will act upon the ink 8 so that the ink 8 at the portion will fly toward the opposing electrode 4.

Figure 8:
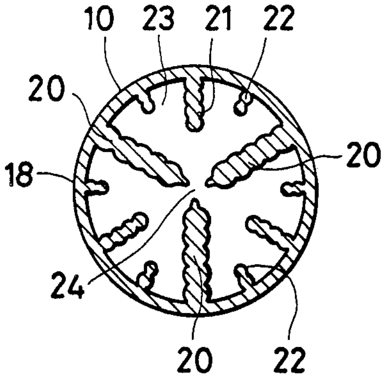
FIG. 8 is a vertical sectional front elevational view showing a modified form of recording electrode.
Figure 9:
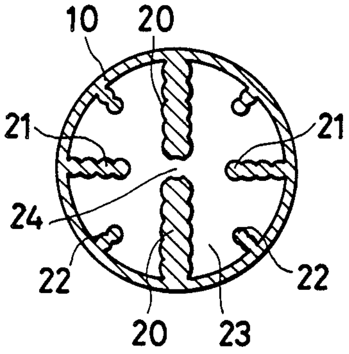
FIG. 9 is a similar view but showing another modified form of recording electrode.

Modified forms of the recording electrode 10 are shown in FIGS. 8 and 9. In FIG. 8, a recording electrode 10 is shown wherein a narrow hole 24 is defined by radially inward ends of three main ribs 20 which extend radially toward the center of the section of the recording electrode 10. On the other hand, FIG. 9 shows a recording electrode 10 which similarly includes two main ribs 20 therein.

Figure 10:
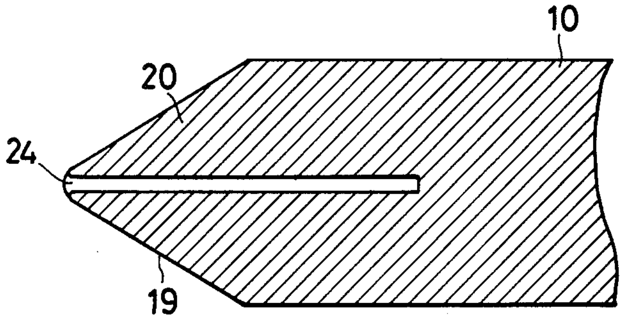
FIG. 10 is a vertical sectional side elevational view of a recording electrode showing a second embodiment of the present invention.

Now, a second embodiment of the present invention will be described with reference to FIG. 10. Like parts are denoted by like reference numerals to those of the first embodiment, and overlapping description thereof will be omitted herein. In the present embodiment, a narrow hole 24 is formed only in an end portion of the recording electrode 10 and is communicated with through-holes 23 which extend from the front end to the rear end of the recording electrode 10. In the recording electrode 10 of such a structure as described just above, ink 8 will be supplied from a rear end portion of the recording electrode 10 into the narrow hole 24 through the through-holes 23 principally by a capillary phenomenon. The ink 8 will then be supplied to the front end of the recording electrode in the narrow hole 24 by a capillary phenomenon.

What is claimed is:

1. A printing device, comprising:

a conductive recording electrode having formed at the center of the section along the entire length thereof a narrow hole for supplying ink to a front end portion of said recording electrode by a capillary phenomenon, said recording electrode further having a through-hole formed therein along the direction of the length thereof, said through-hole communicating with said narrow hole and a rear end portion of said recording electrode; and an opposing electrode located in an opposing relationship to said recording electrode with a record medium interposed therebetween.

2. A printing device according to claim 1, further comprising a driving means for applying an electric field between said recording electrode and said opposing electrode.

3. A printing device according to claim 1, wherein said printing device comprises a plurality of such recording electrodes.

4. A printing device according to claim 1, wherein said recording electrode has a plurality of ribs formed so as to extend radially inwardly from an inner circumferential wall thereof toward the center of the section thereof, said narrow hole being provided by a spacing at which radially inner ends of said ribs oppose to each other while said through-hole is provided by a spacing defined by other portions of said ribs.

5. A printing device according to claim 4, wherein said ribs include four main ribs of a same profile formed in an equally spaced relationship and defining said narrow hole by the radially inward ends thereof, four smaller ribs of a same profile formed in an equally spaced relationship between said main ribs, and eight further smaller ribs of a same profile formed in an equally spaced relationship between said main ribs and said smaller ribs.

6. A printing device according to claim 5, wherein each of said main ribs, said smaller ribs and said further smaller ribs has portions of a smaller cross sectional area and portions of a greater cross sectional area formed successively therein.

7. A printing device according to claim 1, wherein each of at least said narrow hole and a portion of said through-hole adjacent said narrow hole has portions of a smaller cross sectional area and portions of a greater cross sectional area formed successively therein.

8. A printing device according to claim 1, wherein the end portion of said recording electrode has a tapered shape.

9. A printing device according to claim 1, wherein the cross sectional area of said through-hole is greater than the cross sectional area of said narrow hole.

10. A printing device according to claim 1, wherein a recording electrode formed by applying a thin metal film to a surface of a molded body which has been formed by extrusion molding using a plastics material as a molding material is used as said recording electrode.

11. A printing device according to claim 1, wherein a recording electrode formed by extrusion molding using, as a molding material, a conductive plastics material in which a conductive substance is mixed is used as said recording electrode.

* * * * *